May 8, 1923.
J. C. WHITE
1,454,661
MACHINE FOR MARKING NUTS
Filed Aug. 18, 1919 3 Sheets-Sheet 3
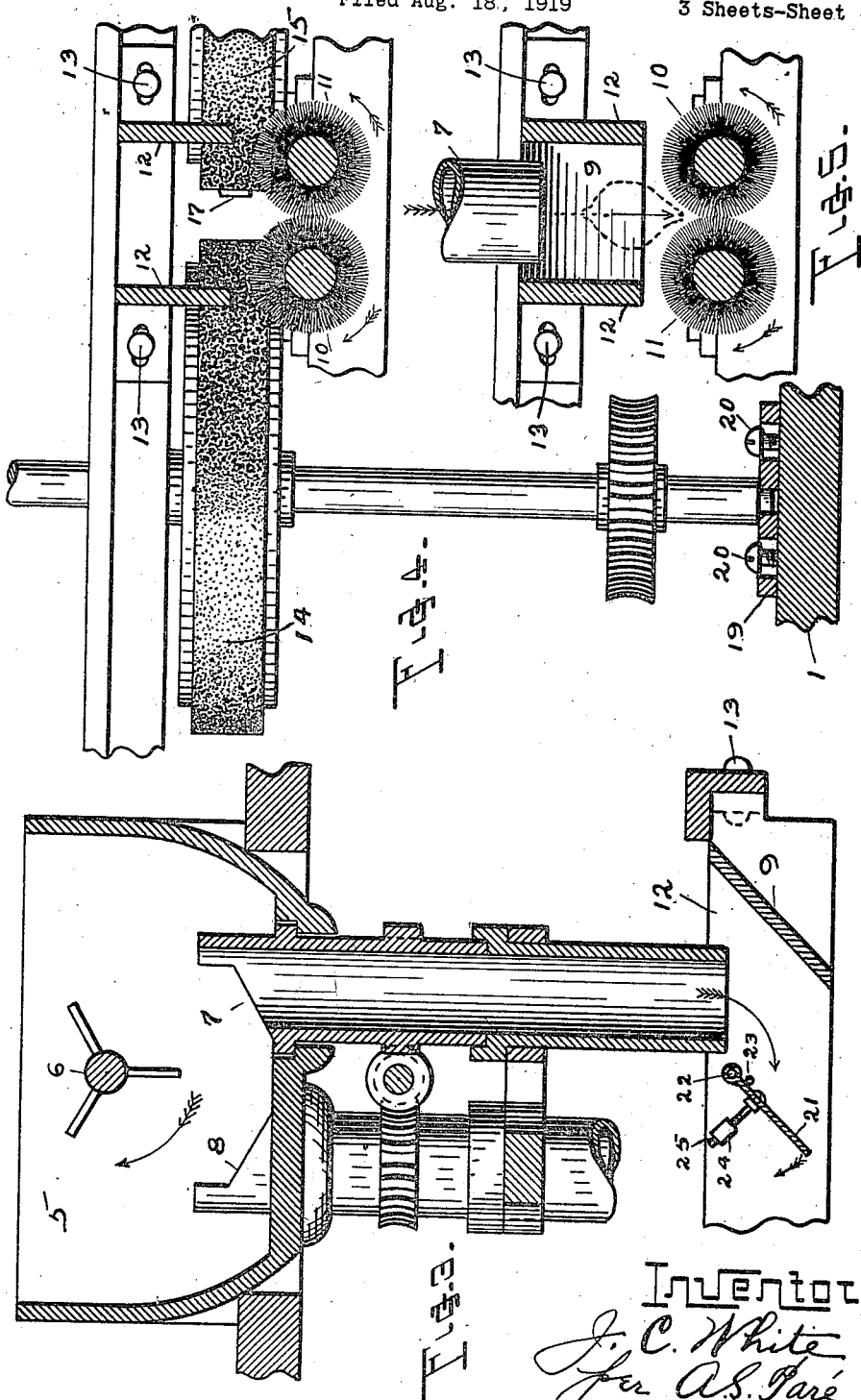

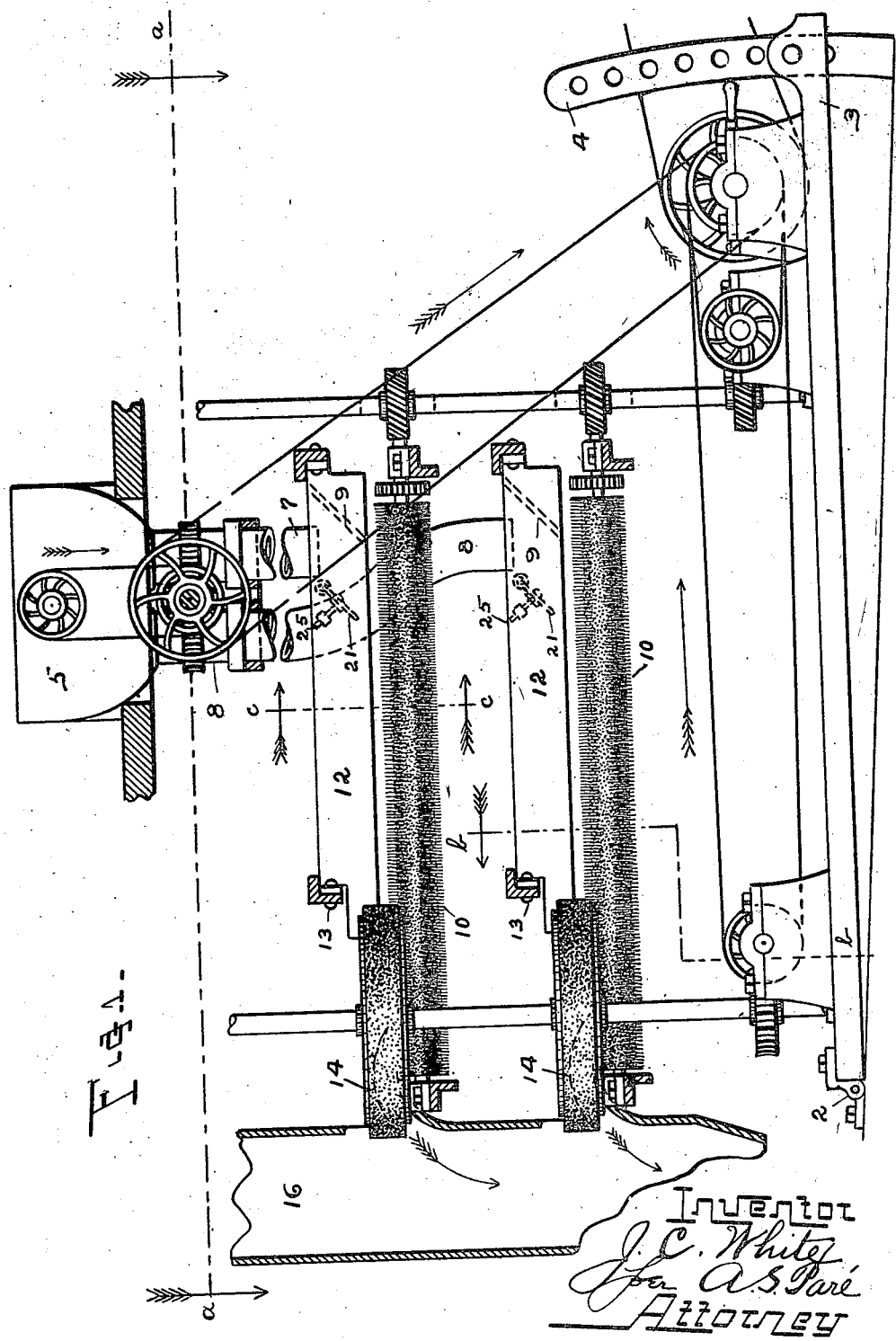

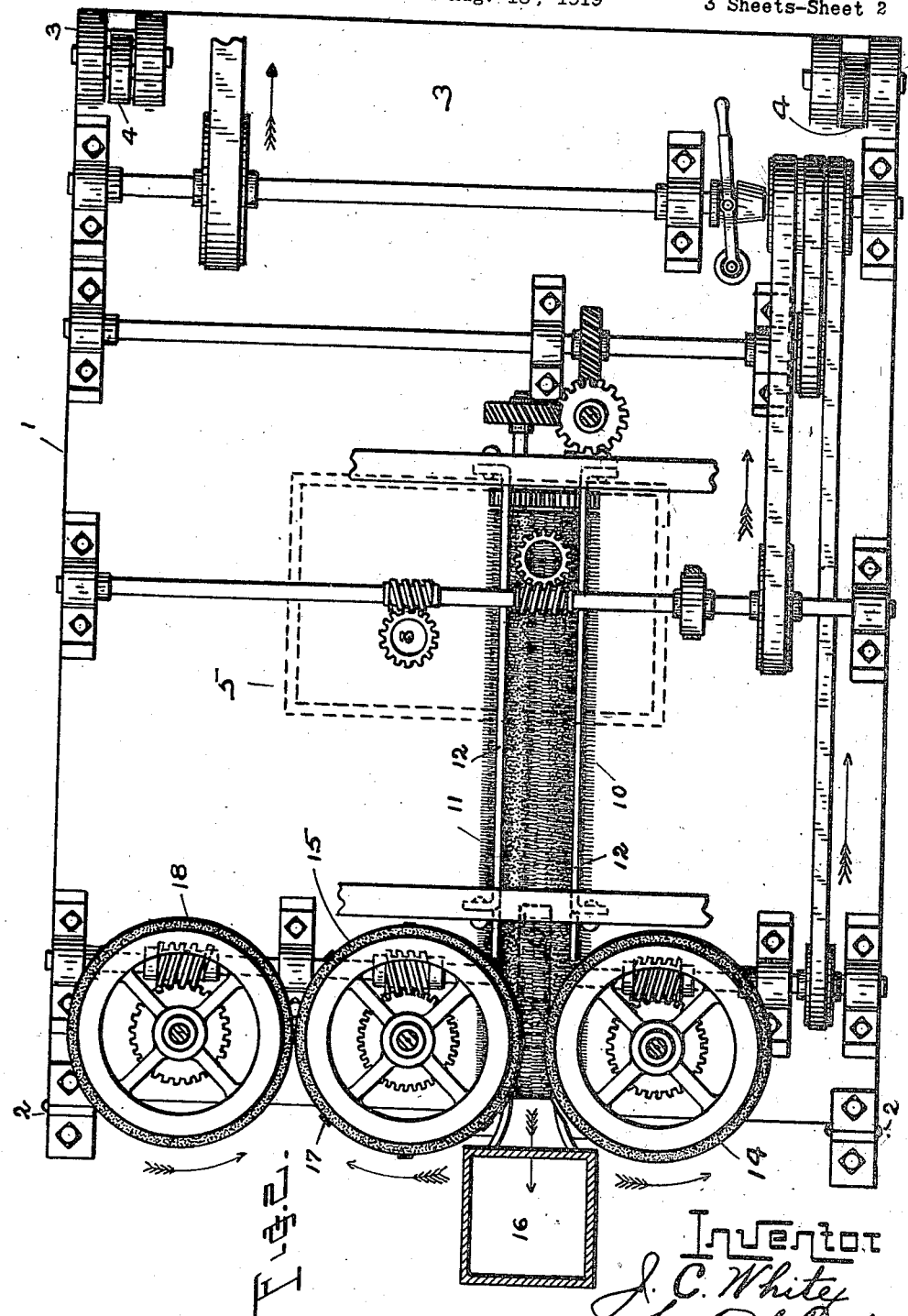

Patented May 8, 1923.

1,454,661

UNITED STATES PATENT OFFICE.

JOHN C. WHITE, OF SAN FRANCISCO, CALIFORNIA.

MACHINE FOR MARKING NUTS.

Application filed August 18, 1919. Serial No. 318,272.

*To all whom it may concern:*

Be it known that I, JOHN C. WHITE, a citizen of the United States, residing in the city and county of San Francisco, in the State of California, have invented certain new and useful Improvements in Machines for Marking Nuts, whereof the following is a specification.

This invention relates to machines for marking nuts, as with a name, or a trademark, or other device.

For the sake of simplicity of description, I will describe the invention as embodied in a machine for marking walnuts, leaving it to the mechanic to adapt it for other uses.

As used for marking walnuts, the machine comprises a hopper into which the nuts are fed, with a stirrer therein to keep them moving, and chutes leading therefrom to the mechanism below. These chutes are mounted in the hopper so as to rotate therein, and are so shaped at their upper ends as, by their rotation, to aid in agitating the nuts in the hopper.

At its lower end, each chute discharges onto an incline, which directs the discharged nuts in the direction in which they are desired to move, and onto rotating brushes, which brushes turn the nuts with their ridges in an approximately vertical plane, and move them onward to the marking mechanism.

The marking mechanism is composed of a type wheel and a platen wheel, between which the nuts pass, and are marked by the type or stamps on the type wheel, being held up thereto by the platen wheel. A suitably placed inking wheel is applied to the type wheel, to ink the stamping devices thereon. From this mechanism the nuts pass into a final discharge chute.

These various instrumentalities are so connected by shafts and gears and belts, that they move with the desired and necessary synchronism.

In the accompanying three sheets of drawing, I have illustrated the mechanism above set forth.

Figure 1 is a side elevation of a two-high machine, partly in section.

Figure 2 is a plan view, or section taken on the line $a$, $a$, of Figure 1, looking downward in the direction of the arrows. The incline at the lower end of the feed chute is omitted in this figure, to expose the mechanism underneath.

Figure 3 is a section on an enlarged scale, taken longitudinally through the feed hopper and one of the feed chutes leading therefrom, and the incline at the bottom thereof.

Figure 4 is a cross-section of the machine, also on an enlarged scale, taken on the line $b$, $b$, of Figure 1, and looking in the direction of the arrow, showing the brushes, marking mechanism and the sides of the conveying channel.

Figure 5 is a cross-section, on the same scale as Figures 3 and 4, taken on the line $c$, $c$, of Figure 1, looking in the direction of the arrows, and shows the rotating brushes which position the nuts and convey them to the marking mechanism, and shows also the end of a feed chute, and the incline at the bottom thereof, and the sides of the conveying channel, of which the brushes constitute the bottom.

In the figures:—The base of the machine, 1, is pivoted at its discharge end 2, and adjustable vertically at its receiving end 3, by means of the standard 4, and means for securing it at different heights upon said standard. The inclination of the base may thus be varied, and, with it, the inclination of the paths of the nuts through the machine, and the speed of the nuts through the machine thereby controlled.

At the top of the machine I arrange a feed hopper 5, having a stirrer 6 therein. From the hopper leads the chutes 7, 8, the upper ends of which are mounted so as to rotate in bearings in the bottom of the hopper. The ends of the chutes projecting into the hopper, are chamfered, as seen in Figure 3, and their rotation provides an additional agitating means for the nuts in the hopper. The nuts passing from the hopper, through chute 7, for example, drop therefrom onto an incline 9, in a conveying channel whose bottom is formed by a pair of rotating brushes 10 and 11, and whose sides are formed by the plates 12. These side plates are adapted for adjustment, to regulate the width of the channel, by means of the slot and bolt construction at 13, as seen more particularly in Figures 4 and 5.

The nuts, descending the inclines 9, upon the brushes, move along the latter, partly owing to gravity and the slope of the channel due to the adjustment of the base at 3, and partly owing to the push of succeeding nuts descending the incline. Thus the nuts are fed along the channel, upon the brushes and by the rotation of the brushes are positioned with their parietal ridges in vertical disposition and their sides laterally disposed, as shown in dotted line Figure 5, until at the ends of the brushes they pass between the wheels 14 and 15, and into the final discharge chute 16.

One of the wheels, as 15, is provided with stamping or printing devices, as 17, which imprint a trade-mark or device upon the side of each nut as it passes, the nut being held up against the same by the wheel 14, which I call the platen wheel. Both wheels, 14 and 15 are provided with cushioned peripheries, composed of any suitable cushioning material, to accommodate the unevenness and varying size of the nuts. The printing stamps 17 may be inked by means of an ink wheel 18, see more particularly Figure 2. It may sometimes be desirable to adjust the space between the wheels 14 and 15, this may be accomplished by means of a step plate 19, with slots and set screws 20, as seen in Figure 4.

To prevent the nuts from piling up on each other and jamming as they leave the chutes and enter the conveying channel, I place a trap door in the channel at that point as shown in full lines in Figure 3 and in dotted lines in Figure 1. 21 is the trap door, pivoted at 22 and hanging obliquely downward against a stop 23, an adjustable weight 24 on the projecting stud 25 regulates the pressure of the door.

I have shown mechanism for giving motion to the various parts of my machine, but I do not think it necessary to describe the same, it being composed of shafts, worms, gears, belts, &c., all operating in manner well known to mechanics.

I have described the course of the nuts passing through chute 7, and parts depending thereon. Their course through chute 8 and parts depending thereon, is exactly similar, and need not be further described.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit of the invention.

What I claim and desire to secure by Letters Patent of the United States, is the following, to wit:

1. A nut marking apparatus comprising a marking mechanism and a conveying channel having a bottom composed of rotating brushes adapted to position the nuts and convey them to the marking mechanism.

2. A nut marking apparatus, comprising a marking mechanism and a conveying channel, said channel having a bottom composed of rotating brushes, said brushes rotating in opposite directions, adapted to position the nuts and deliver them to the marking mechanism.

3. A nut marking apparatus, comprising a marking mechanism and brushes for directing and positioning the nuts to the marking mechanism.

4. A nut marking apparatus, comprising a brush feeding device, means adapted to position the nuts and rotary means for holding and marking said nuts.

5. A nut marking apparatus, comprising a brush conveying device, a rotating marking means and vertically rotating means for feeding said conveying means.

6. A nut marking apparatus, comprising a brush bottomed conveying channel, and wheels for marking and holding said nuts.

7. A nut marking apparatus, comprising a brush bottomed conveying channel, and wheels for marking and guiding said nuts, and means for adjusting said wheels.

8. A nut marking apparatus, comprising a rotary conveying and marking mechanism, and means for tilting said conveying mechanism.

9. A nut marking apparatus, comprising a rotary conveying and marking mechanism, a base for said mechanism, means for tilting said base, and means for varying the degree of said tilt.

10. A nut marking apparatus, comprising an adjustable tilting base and feeding and marking means mounted upon said base.

11. A nut marking apparatus, comprising a conveying channel having adjustable sides and a brush bottom.

12. A nut marking apparatus, comprising conveying and marking mechanism, a feed hopper and chutes leading therefrom to the conveying mechanism, said chutes rotatable in said hopper.

13. A nut marking apparatus, comprising a feed hopper and chutes communicating therewith, said chutes projecting into said hopper and having chamfered and rotatable ends within said hopper.

14. A nut marking apparatus, comprising a conveyor, a hopper and chute for receiving and delivering nuts to said conveyor, and an inclined hinged member provided with an adjustable weight at the end of the chute for giving direction to the nuts as they engage the conveyor.

15. A nut marking apparatus, comprising a rotary inclined conveying channel, a marking mechanism, means for inking said mechanism, an inclined guiding mechanism opposite said marking mechanism and a discharge chute adapted to receive the nuts from said marking and guiding mechanism.

16. A nut marking apparatus, comprising a conveying channel, said channel consisting of lateral plates adapted for adjustment to regulate centrally, the width of the channel, a marking mechanism, means for inking said marking mechanism and a worm for operating said marking and inking mechanism.

17. A nut marking apparatus, comprising a longitudinal rotating feeding channel and a directing hinged flap provided with a weight, located above the point at which the nuts enter said channel.

18. A nut marking apparatus, comprising rotary feeding means, rotary conveying means, means for directing the nuts upon said rotary conveying means, a hinged flap for preventing jamming of the nuts on said rotary conveying means, and means for holding said hinged flap upon said nuts.

In testimony that I claim the foregoing, I have hereto set my hand this 11th day of Aug. 1919, in the presence of two witnesses.

JOHN C. WHITE.

Witnesses:
PAULINE W. WHITE,
FLORENCE L. WOLFE.